United States Patent
Knittel et al.

(10) Patent No.: US 10,995,389 B2
(45) Date of Patent: May 4, 2021

(54) COMPOSITION FOR FABRICATING PARTS OUT OF TITANIUM ALUMINIDE BY SINTERING POWDER, AND A FABRICATION METHOD USING SUCH A COMPOSITION

(71) Applicant: SAFRAN AIRCRAFT ENGINES, Paris (FR)

(72) Inventors: Stéphane Knittel, Saint-Fargeau Ponthierry (FR); Guillaume Fribourg, Grenoble (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 295 days.

(21) Appl. No.: 15/573,043

(22) PCT Filed: May 11, 2016

(86) PCT No.: PCT/FR2016/051109
§ 371 (c)(1),
(2) Date: Nov. 9, 2017

(87) PCT Pub. No.: WO2016/185115
PCT Pub. Date: Nov. 24, 2016

(65) Prior Publication Data
US 2018/0112293 A1     Apr. 26, 2018

(30) Foreign Application Priority Data
May 21, 2015    (FR) ...................................... 1554550

(51) Int. Cl.
    *C22C 14/00*      (2006.01)
    *C22C 21/00*      (2006.01)
    *C22C 1/04*       (2006.01)
    *B22F 3/10*       (2006.01)
    *B22F 3/15*       (2006.01)
    (Continued)

(52) U.S. Cl.
CPC ............ *C22C 14/00* (2013.01); *B22F 3/1007* (2013.01); *B22F 3/15* (2013.01); *B22F 3/225* (2013.01); *B22F 3/24* (2013.01); *C22C 1/0491* (2013.01); *C22C 21/00* (2013.01); *B22F 10/00* (2021.01); *B22F 2003/248* (2013.01); *B22F 2201/11* (2013.01); *B22F 2998/10* (2013.01);
(Continued)

(58) Field of Classification Search
CPC ................................ C22C 14/00; B33Y 70/00
USPC .......................................................... 419/23
See application file for complete search history.

(56) References Cited

U.S. PATENT DOCUMENTS

| | | |
|---|---|---|
| 5,032,353 A | 7/1991 | Smarsly et al. |
| 2002/0085941 A1 | 7/2002 | Deevi et al. |

(Continued)

OTHER PUBLICATIONS

International Search Report as issued in International Patent Application No. PCT/FR2016/051109, dated Aug. 31, 2016.
(Continued)

*Primary Examiner* — Weiping Zhu
(74) *Attorney, Agent, or Firm* — Pillsbury Winthrop Shaw Pittman LLP

(57) ABSTRACT

A composition for sintering to fabricate a part comprising an alloy based on titanium aluminide, the composition including a powder of an alloy based on titanium aluminide, and an addition powder including a mixture of a metallic aluminum powder and of a metallic titanium powder. The composition includes 0.5% to 5% by weight of addition powder.

11 Claims, 1 Drawing Sheet

(51) Int. Cl.
*B22F 3/22* (2006.01)
*B22F 3/24* (2006.01)
*B22F 10/00* (2021.01)
*B33Y 70/00* (2020.01)

(52) U.S. Cl.
CPC ........... *B22F 2999/00* (2013.01); *B33Y 70/00* (2014.12); *Y02P 10/25* (2015.11)

(56) References Cited

U.S. PATENT DOCUMENTS

2010/0015463 A1  1/2010  Siak et al.
2011/0103994 A1*  5/2011  Siak ..................... B22F 1/0003
                                                                              419/23

OTHER PUBLICATIONS

Gerling, R., et al., "Metal injection moulding of gamma titanium aluminide alloy powder," Materials Science and Engineering A: Structural Materials: Properties, Microstructures and Processing, vol. 423, No. 1-2, May 2006, XP027952396, pp. 262-268.

* cited by examiner

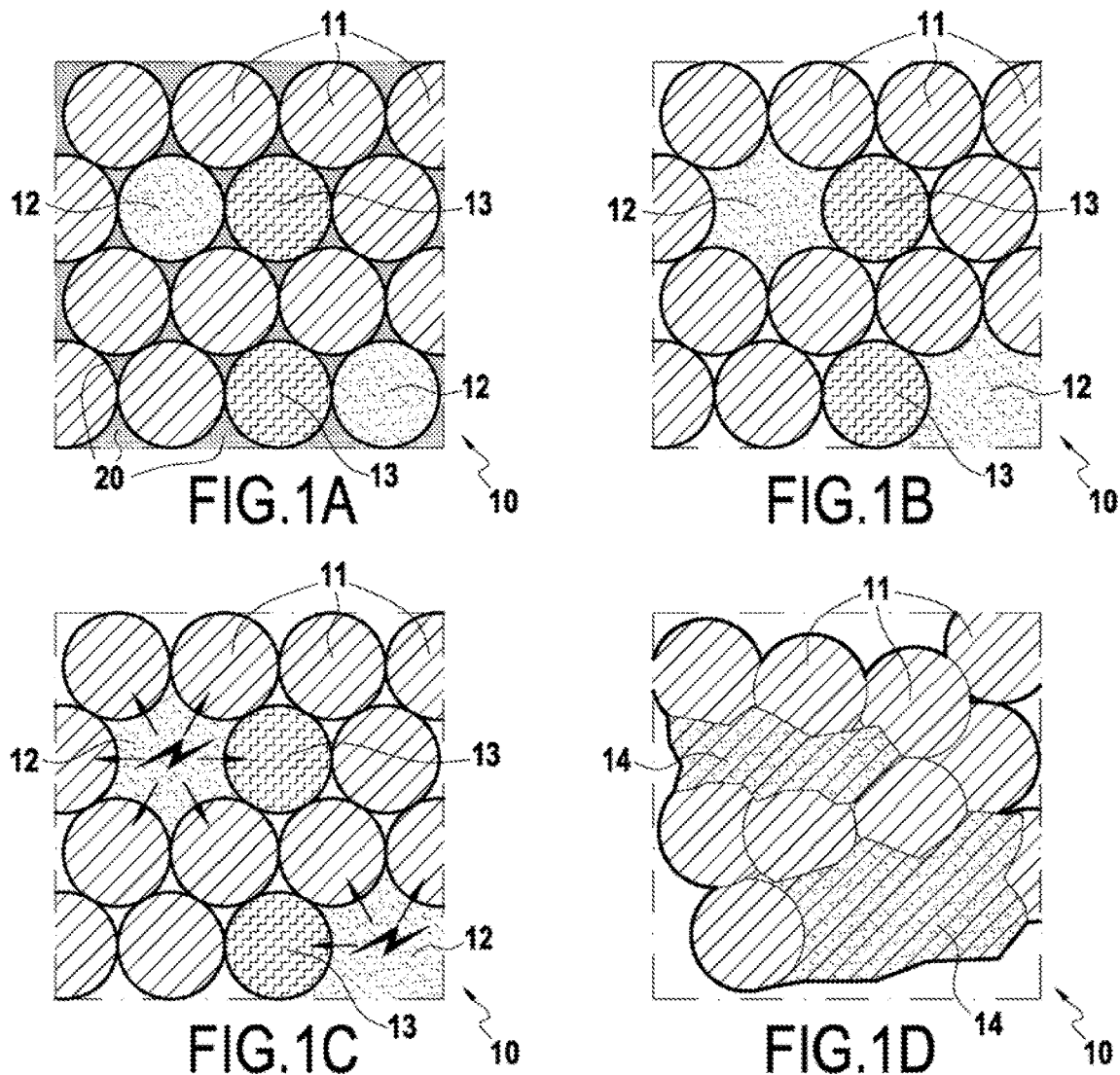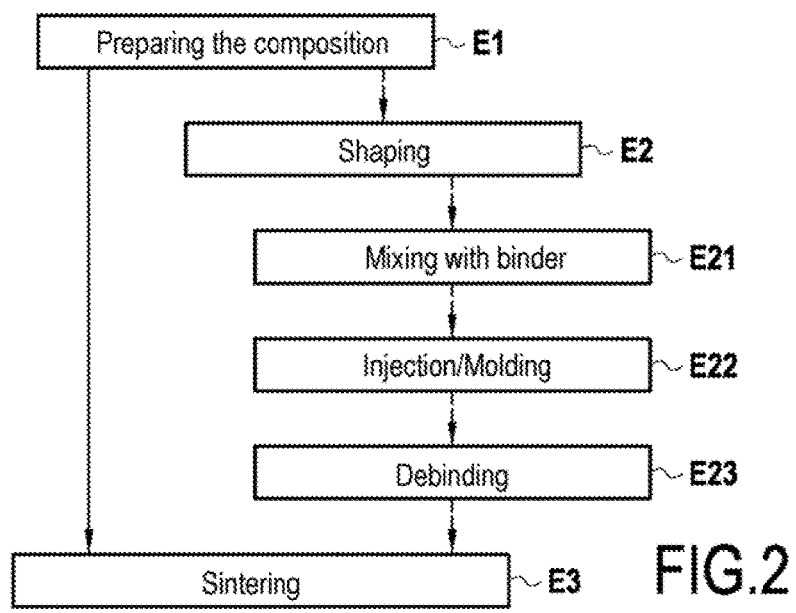

COMPOSITION FOR FABRICATING PARTS OUT OF TITANIUM ALUMINIDE BY SINTERING POWDER, AND A FABRICATION METHOD USING SUCH A COMPOSITION

CROSS REFERENCE TO RELATED APPLICATIONS

This application is the U.S. National Stage of PCT/FR2016/051109 filed May 11, 2016, which in turn claims priority to French Application No. 1554550, filed May 21, 2015. The contents of both applications are incorporated herein by reference in their entirety.

BACKGROUND OF THE INVENTION

The present invention relates to the general field of methods of fabricating parts out of alloys based on titanium aluminides. The present invention applies more particularly, but not exclusively, to fabricating parts for aviation.

Alloys based on titanium aluminides are used nowadays in the field of aviation, in particular because of the advantages they present for reducing the onboard weight within fairly hot portions of turbine engines. Specifically, these alloys generally present a mean density of about 4 g/cm$^3$ and they constitute a viable alternative to conventional alloys based on nickel (having a mean density of about 8.5 g/cm$^3$). Their good mechanical properties and their ability to withstand oxidation at temperatures not exceeding 750° C. make them candidates of choice, e.g. for fabricating low pressure turbine blades in aviation turbine engines.

Such parts made of an alloy based on titanium aluminide are traditionally fabricated by casting, thereby leading to extra costs associated with removing material when the parts are machined.

Techniques using powder metallurgy constitute an advantageous alternative to conventional casting techniques for the purpose of reducing production costs. Nevertheless, those techniques involve a step of sintering at very high temperatures, which can be limiting in practice. In addition, the density of parts obtained by powder metallurgy is sometimes insufficient in certain applications.

For example, when it is desired to obtain complete sintering (with density greater than 95%) of a powder based on titanium aluminide, such as TiAl 48-2-2, it is necessary to work at temperatures close to the melting temperature of the alloy, namely about 1455° C. In practice, for sintering, use is generally made of temperatures in the range 1380° C. to 1450° C., which makes the fabrication method very expensive in energy terms. Furthermore, the tooling used for sintering such powders, e.g. temperature regulated ovens, needs to operate at temperatures close to its utilization limits, which can shorten its lifetime and increase maintenance costs.

OBJECT AND SUMMARY OF THE INVENTION

A main object of the present invention is thus to mitigate such drawbacks by proposing a composition for sintering to fabricate a part comprising an alloy based on titanium aluminide, the composition comprising a powder of an alloy based on titanium aluminide, and an addition powder comprising a mixture of a metallic aluminum powder and of a metallic titanium powder.

The composition of the invention is remarkable in that it enables the amount of energy needed for sintering to be reduced, regardless of the sintering technique that is used. Specifically, during the rise in temperature, the addition powder present in the composition delivers energy in the form of local hot points distributed within the composition.

When the temperature of the composition is close to the melting temperature of metallic aluminum (about 660° C.), the grains of metallic aluminum begin to melt, and a chemical reaction is initiated between the metallic aluminum and the metallic titanium for forming a titanium aluminide. This chemical reaction is exothermic and delivers energy in the form of heat to the composition, with this being controllable by varying the quantity of addition powder that is added to the composition. This delivery of energy makes it possible to initiate sintering of the alloy powder early, as from 660° C., whereas it normally begins in the range 900° C. to 1000° C. Thus, densification of the composition is already advanced when the sintering temperature level is reached, thereby making it possible to obtain parts of greater density at the end of sintering.

The presence of these hot points in situ within the composition also serves to reduce the sintering temperature level. Thus, degradation of the heating means used is limited as is the amount of energy needed to perform sintering (by way of example the heating means may consist in: a temperature-regulated oven, a laser, an electron beam, plasma heating, etc.). Furthermore, the reduction in the sintering temperature level makes it possible to reduce the time needed to reach that level, and thus to reduce the duration of the entire sintering cycle.

By using the composition of the invention, energy is delivered in situ in uniform manner within the composition. Unlike prior art compositions, which are generally heated by diffusion from the outside towards the inside, the temperature of the composition of the invention increases simultaneously and in uniform manner throughout the composition, in particular because of the exothermic reaction between the aluminum and the titanium. Thus, sintering is more uniform when using the composition of the invention.

Grains of metallic aluminum melting as from 660° C. also plays a role in maintaining the structure of the composition, which is generally shaped prior to being sintered (e.g. by using an organic binder and an injection/molding method, or by compression). Specifically, the grains of aluminum that liquefy also serve to fit around the grains surrounding them and to increase inter diffusion of the various elements within the composition, thereby achieving "pre-sintering" of the composition. This pre-sintering also serves to minimize deformation of the composition that might occur during the sintering step, with the liquid aluminum thus playing the role of a reactive metallic binder for the other grains.

Finally, adding the addition powder comprising aluminum and titanium does not significantly modify the chemical composition of the alloy that is obtained after sintering, since the addition powder diffuses within the composition and also forms a titanium aluminide after reacting. The physico-chemical properties of a part obtained by sintering a composition of the invention are thus altered very little compared with a part obtained by sintering a powder of an alloy based only on titanium aluminide.

If the powder of titanium aluminide based alloy includes addition elements (e.g. chromium or niobium), they may become diluted in the composition by the addition powder. It is then possible, if necessary, to add such elements to the composition of the invention in order to re-establish their initial contents in the final alloy.

The composition includes 0.5% to 5% by weight of addition powder. Thus, the content by weight of addition powder is sufficiently small to avoid excessively modifying the physico-chemical properties of the alloy based on titanium aluminide in the composition. The addition powder can thus act merely as a sintering additive for the composition. In an embodiment, the composition includes 0.5% to 2% by weight of addition powder.

Preferably, the Ti/Al atomic ratio of the addition powder lies in the range 0.7 to 1.3 in order to avoid significantly modifying the chemical composition of the powder of alloy based on titanium aluminide. In an embodiment, the Ti/Al atomic ratio in the addition powder may lie in the range 0.8 to 1.2, or indeed in the range 0.9 to 1.1.

Also preferably, the powder of alloy based on titanium aluminide has a mean grain size lying in the range 1 micrometer ($\mu$m) to 100 $\mu$m, and more preferably the range 5 $\mu$m to 50 $\mu$m.

In an embodiment, the addition powder presents a mean grain size substantially identical to that of the powder of titanium aluminide based alloy. In a variant, the addition powder may present a mean grain size smaller than that of the powder of alloy based on titanium aluminide, so as to modify the distribution of hot points within the composition.

The powder of titanium aluminide based alloy may comprise a titanium aluminide having a content by weight of titanium greater than or equal to 45% and a content by weight of aluminum greater than or equal to 40%. For example, these alloys may be of the TiAl 48-2-2, TNM, or TNB type, or more generally they may form part of the family alloys based on titanium aluminide having gamma/alpha2 or beta/gamma/alpha2 phases.

The invention also provides a method of fabricating a part comprising a titanium aluminide, the method comprising the following steps:
  preparing a composition as described above; and
  sintering the composition.

In an implementation, the method may further comprise, before the sintering step, a step of shaping the composition in order to obtain a preform of the part to be fabricated.

By way of example, when a molding technique involving injecting metal powder is used (known as metal injection molding (MIM)), the step of shaping the composition may comprise the following sub-steps:
  injecting a mixture of the composition and a binder into a mold in order to obtain a blank of the part to be fabricated; and
  debinding the blank in order to obtain the preform of the part to be fabricated.

The sintering step may be performed:
  in a temperature-regulated oven;
  by flash sintering (also referred to as spark plasma sintering (SPS));
  by selective sintering on a powder bed (e.g. electron beam melting (EBM), or indeed selective laser sintering (SLS)); or
  by hot isostatic pressing (HIP).

It is advantageous to perform the sintering step under an inert atmosphere of argon, in particular in order to reduce the risk of oxidizing the metallic aluminum and the metallic titanium present in the composition.

Finally, the invention also provides a method as described above in which the part to be fabricated is an aviation part. The term "aviation part" is used to mean a part suitable for use in a turbojet for propelling an aircraft, for example: a blade for an aviation turbine engine, a turbine ring, a low-pressure nozzle, a system for injection into an aviation combustion chamber, a component of an aviation injector system, a flange, a clamping system, a support for engine equipment, a cowling, etc.

BRIEF DESCRIPTION OF THE DRAWING

Other characteristics and advantages of the present invention appear from the following description made with reference to the accompanying drawing, which show an embodiment having no limiting character. In the figures:

FIGS. 1A to 1D are diagrams showing how a composition of the invention varies during a method in an implementation of the invention; and FIG. 2 is a flow chart showing the various steps of a method of the invention.

DETAILED DESCRIPTION OF THE INVENTION

The invention is described below in its application to fabricating parts out of an alloy based on titanium aluminide by means of a metal injection molding (MIM) method. Naturally, the invention may be applied to any technique for fabricating parts that involve sintering a powder of an alloy based on titanium aluminide.

The steps of a method in an implementation of the invention are shown diagrammatically in the flow chart of FIG. 2.

Initially, a titanium aluminide powder is mixed (step E1) with an addition powder comprising metallic aluminum powder and metallic titanium powder in order to form a composition of the invention.

By way of example, it is possible to use a powder of a TiAl-48-2-2 alloy presenting a mean grain size lying in the range 5 micrometers ($\mu$m) to 50 $\mu$m. The metallic aluminum and metallic titanium powders may present a mean grain size of the same order as that of the powder of the alloy based on titanium aluminide (e.g. a size within ±50% of the alloy powder size).

Care should be taken that the content by weight in the composition of addition powder lies in the range 0.5% to 5%, preferably in the range 0.5% to 2%. In addition, the Ti/Al atomic ratio of the addition powder, i.e. in the addition powder, preferably lies in the range 0.7 to 1.3.

The alloy based on titanium aluminide may include addition elements such as for example chromium or niobium for a TiAl 48-2-2 alloy. When the addition powder is added to the alloy powder, the content by weight of these addition elements may drop a little in the composition relative to their content by weight in the initial alloy powder. Consequently, where necessary, care should be taken to add addition elements to the composition so that their content remains substantially identical to that of the initial alloy powder.

It is important to mix all of the powders correctly in order to ensure that the composition is uniform. For example, it is possible to use an automatic mixer for a period of 1 hour (h) to 2 h. Furthermore, it is preferable to perform the mixing step under an inert atmosphere, e.g. of argon, since non-alloyed metals such as metallic titanium and metallic aluminum tend to oxidize quickly in free air, particularly when the grain sizes of the powders are small.

In general manner throughout the method, care is taken to avoid exposing the composition to dioxygen by keeping within an inert atmosphere in order to limit oxidation.

Once the composition has been prepared by mixing, it is shaped (step E2). Shaping the composition makes it possible to obtain a preform for the part that is subsequently sintered (other methods do not involve such a shaping step, such as for example sintering on a powder bed).

In a MIM method, shaping the composition begins with mixing a binder with the composition (step E21).

In known manner, the binder may comprise a compound selected from: paraffins, thermoplastic resins, thermosetting resins, agar gel, cellulose, polyethylene, polyethylene glycol, polypropylene, stearic acid, polyoxymethylene, and mixtures thereof.

Once the composition has been mixed with a binder and raised to a temperature allowing it to be injected, the mixture is injected (step E22) into a temperature-regulated mold (the mold having the shape of the part that is to be fabricated). Once injection has terminated, cooling the injected mixture by means of the mold serves to obtain a blank for the part in a plastic state.

FIG. 1A is a diagram showing the arrangement of powder grains of the composition 10 within the blank in the plastic state. There can be seen grains 11 of titanium aluminide-based powder, grains 12 of metallic aluminum powder, grains 13 of metallic titanium powder, together with a binder 20 (or a mixture of binders) in which the composition 10 is embedded.

The following step is debinding the blank (step E23), which consists in selectively eliminating the binder or the mixture of binders present in the blank as shaped in this way. In known manner, it is possible to perform debinding chemically, e.g. using a solvent, followed by thermal debinding.

Thermal debinding generally consists in subjecting the blank to several temperature levels under an inert atmosphere in order to eliminate the binders present in succession. The temperature of the highest level generally does not exceed 700° C.

During thermal debinding, the grains 12 of the metallic aluminum may begin to lose their ductility and take on the shape between the various grains of the composition 10.

FIG. 1B shows the state of the composition 10 of the invention at the end of the debinding step or at the beginning of the rise in temperature for the sintering step (step E3).

In this figure, the temperature of the composition 10 has exceeded 660° C., which corresponds to the melting temperature of metallic aluminum. It can be seen that the binder 20 is no longer present, and that the grains of aluminum 12 are beginning to melt so as to take on the shape of the grains 11 and 13 surrounding them. Melting the aluminum thus serves to consolidate the preform obtained after debinding the blank, and to prevent it from deforming.

At the same time as it melts, the metallic aluminum reacts, in particular with the metallic titanium (FIG. 1C) so as to form a titanium aluminide of the $Ti_xAl_y$ type where x and y depend in particular on the Ti/Al atomic ratio of the addition powder (which preferably lies in the range 0.7 to 1.3). The aluminum can also react with the titanium aluminide-based alloy that is already present. These chemical reactions, which are exothermic, serve to deliver energy in the form of heat within the preform itself. The energy given off in this way in situ by these local points of combustion is distributed uniformly throughout the preform since the composition was previously well mixed (step E1).

The heat given off in situ by the reaction between the metallic aluminum and metallic titanium serves to initiate sintering and begin densifying the preform as soon as the temperature approaches and then exceeds about 660° C.

It is possible to control this phenomenon accurately since the quantity of energy given off by the in situ reactions increases with increasing quantity of addition powder in the composition.

The temperature rise for the sintering step (step E3) continues until reaching a sintering level of temperature that can be reduced as a result of using the composition 10 of the invention. Specifically, the energy that needs to be delivered to the preform in order to sinter it is reduced by the energy that has already been delivered by the above-described exothermic reaction.

During the temperature rise, and while at the sintering level, inter-diffusion phenomena takes place, in particular between the metallic aluminum and the already-present titanium aluminide, thereby further enhancing the sintering of the preform.

Just like preparing the composition (step E1) and shaping the composition (step E2), it is preferable to perform the sintering (step E3) under an inert atmosphere of argon in order to prevent oxidation of non-alloyed metals.

FIG. 1D is a diagram showing the state of the composition 10 following the sintering step. It can be seen that densification has terminated, and that $Ti_xAl_y$ type titanium aluminide phases 14 resulting in particular from the reaction between metallic aluminum 12 and metallic titanium 13 are present.

In order to ensure that the resulting alloy is uniform and stable, it is also possible to perform diffusion heat treatment after sintering.

The invention may also be applied to methods of the spark plasma sintering (SPS) or flash sintering type, and to methods of the hot isostatic pressing (HIP) type. In these methods, the shaping and the sintering of the part are performed simultaneously. The temperature rise gives rise to the above-described exothermic chemical reactions making it possible to obtain better densification of the part and to reduce energy consumption during the sintering cycle.

Finally, the invention may also be applied to methods of the additive fabrication type involving sintering a bed of powder, whether of the selective laser sintering (SLS) or of the electron beam melting (EBM) types, for example. These methods do not require a step of shaping the composition. The composition of the invention is advantageous in methods of this type in that it makes it possible to reduce the amount of energy delivered during sintering (by reducing the intensity of the electron beam or of the laser, for example).

EXAMPLE

A low pressure turbine blade was made for an aviation turbine engine using an MIM method.

A composition in accordance with the invention was initially prepared comprising by weight:
  1% of an addition powder having a mean grain size of 18 μm, comprising metallic aluminum and metallic titanium at a Ti/Al atomic ratio substantially equal to 1; and
  99% of a pre-alloyed powder of TiAl 48-2-2 having a mean grain size of 18 μm.

The composition was mixed in an automatic mixer for 2 h under an inert atmosphere of argon.

Thereafter the composition was mixed with a binder made up for the most part of paraffin wax, poly(ethylene vinyl acetate), and stearic acid. The binder represented about 40% by volume of the mixture.

The mixture was injected into the cavity of a mold having its temperature regulated at 120° C.

The blank in the plastic state was unmolded and then immersed in a bath of hexane at 40° C. for 10 h in order to eliminate a portion of the binder by dissolution.

Thereafter, the blank was subjected to thermal debinding in a temperature-regulated oven under an inert atmosphere of argon, by successive temperature levels of 250° C. for 2 h, and 400° C. for 2 h, with a temperature rise ramp at 2° C./minute.

The sintering level at 1350° C. was then reached via a temperature rise ramp at 5° C./min. The sintering level was maintained for a duration of 4 h. Thereafter, the part was cooled with a downward ramp of 5° C./min.

Finally, the part was set at 1380° C. for 10 h in order to perform post-sintering diffusion heat treatment.

By means of such a method, the density of the resulting part typically reached 95%, and the temperature of the sintering level could be lowered typically by 30° C. to 60° C.

The invention claimed is:

1. A composition for sintering to fabricate a part comprising an alloy based on titanium aluminide, the composition comprising a powder of an alloy based on titanium aluminide, and an additive powder comprising a mixture of a metallic aluminum powder and a metallic titanium powder, wherein the composition includes 0.5% to 2% by weight of the additive powder, wherein the Ti/Al atomic ratio of the additive powder lies in the range 0.7 to 1.3.

2. A composition according to claim 1, wherein the powder of titanium aluminide based alloy has a mean grain size lying in the range 1 μm to 100 μm.

3. A composition according to claim 1, wherein the additive powder presents a mean grain size identical to that of the powder of titanium aluminide based alloy.

4. A composition according to claim 1, wherein the powder of titanium aluminide based alloy comprises a titanium aluminide having a content by weight of titanium greater than or equal to 45% and a content by weight of aluminum greater than or equal to 40%.

5. A composition according to claim 1, wherein said composition has an initial sintering temperature of 660° C.

6. A method of fabricating a part comprising titanium aluminide, the method comprising:
   preparing a composition according to claim 1; and
   sintering the composition.

7. A method according to claim 6, further comprising, before the sintering, shaping the composition in order to obtain a preform of the part to be fabricated.

8. A method according to claim 7, wherein shaping the composition comprises:
   injecting a mixture of the composition and a binder into a mold in order to obtain a blank of the part to be fabricated; and
   debinding the blank in order to obtain the preform of the part to be fabricated.

9. A method according to claim 6, wherein the sintering is performed:
   in a temperature-regulated oven;
   by flash sintering;
   by selective sintering on a powder bed; or
   by hot isostatic pressing.

10. A method according to claim 6, wherein the sintering is performed under an inert atmosphere of argon.

11. A method according to claim 6, wherein the part to be fabricated is a part for aviation.

* * * * *